United States Patent [19]
Llewellyn

[11] Patent Number: 5,172,397
[45] Date of Patent: Dec. 15, 1992

[54] SINGLE CHANNEL SERIAL DATA RECEIVER

[75] Inventor: William D. Llewellyn, San Jose, Calif.

[73] Assignee: National Semiconductor Corporation, Santa Clara, Calif.

[21] Appl. No.: 664,911

[22] Filed: Mar. 5, 1991

[51] Int. Cl.$^5$ .......................................... H04L 7/033
[52] U.S. Cl. .................................. 375/110; 307/269; 307/601
[58] Field of Search ...................... 375/106, 110, 111; 307/269, 601, 602, 605, 606; 328/55, 63

[56] References Cited

U.S. PATENT DOCUMENTS

| | | | |
|---|---|---|---|
| 3,683,288 | 8/1972 | Curry | 375/110 |
| 4,523,158 | 6/1985 | Megeid | 375/106 |
| 4,535,459 | 8/1985 | Hogge, Jr. | 375/80 |
| 4,667,333 | 5/1987 | Butcher | 375/106 |
| 4,694,196 | 9/1987 | Hasley et al. | 307/269 |
| 4,740,998 | 4/1988 | House | 375/110 |
| 4,796,280 | 1/1989 | Nesin et al. | 375/110 |
| 4,949,361 | 8/1990 | Jackson | 375/118 |
| 4,988,892 | 1/1991 | Needle | 307/269 |
| 5,027,085 | 6/1991 | DeVito | 331/1 A |
| 5,056,114 | 10/1991 | Wight | 375/110 |
| 5,058,140 | 10/1991 | Johnson | 375/110 |

Primary Examiner—Benedict V. Safourek
Attorney, Agent, or Firm—Townsend and Townsend

[57] ABSTRACT

A data latch circuit, a gated clock circuit and a delay line circuit for receiving and decoding combined serial data and clock information are disclosed. The data latch circuit, by eliminating the need to use a clear signal, has no "blind spot" with regards to incoming data and can therefore accept data at a faster rate than known circuits. The gated clock also does not utilize the clear signal of the known art and can therefore produce a higher frequency clock pulse. The delay line prevents pulse compression and pulse collapse by means of a flip-flop and exclusive OR means. The circuits may be used together in a receiver for receiving combined serial data and clock information.

14 Claims, 9 Drawing Sheets

SINGLE CHANNEL SERIAL DATA RECEIVER

BACKGROUND OF THE INVENTION

This invention is in the field of digital data transmission and reception. More particularly, it comprises a digital data receiver having a fast data synchronizing latch, a fast clock gate, and improved delay line.

Serial data applications such as disk drives, local area networks ('LANs') and optical data storage transmit and receive data in the form of discrete data pulses. To simplify the transmission requirements, the data and related clock information are combined and transmitted over a single serial channel by using an appropriate form of data encoding. The unit which receives this combined data/clock digital signal incorporates the circuits necessary to recover the clock signal and data.

Figure 1:
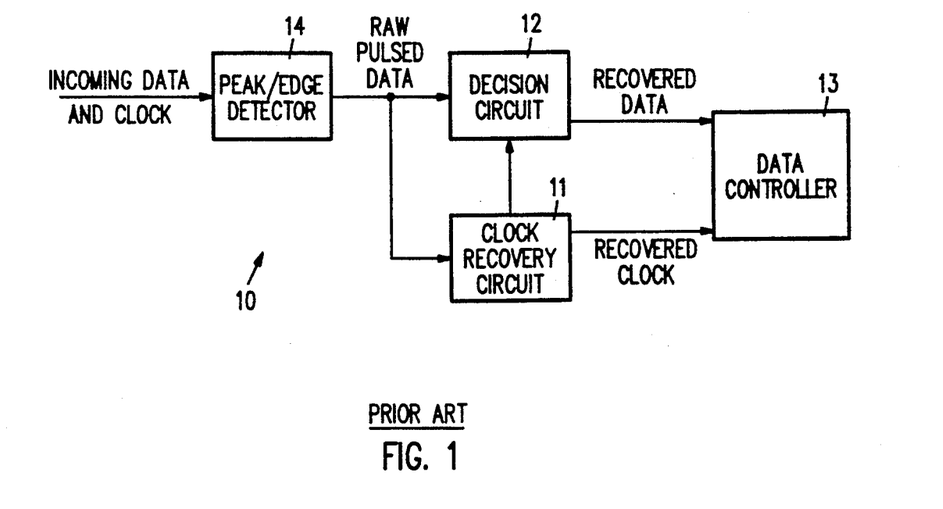
FIG. 1 is a block diagram of a known data and clock receiver.

A known clock/data receiver circuit is shown in FIG. 1. In receiver 10, clock recovery circuit 11 typically comprises a phase-locked loop ('PLL') which generates a local clock, the rising edges of the local clock being coincident with the rising edges of the incoming data pulses, received from Peak/Edge detector 14. If 50% symmetry is maintained in the recovered clock waveform, the falling edges of the clock are exactly coincident with the data bit cell boundaries. The clock falling edges are then used by decision circuit 12 to re-clock the data.

Decision circuit 12 is subject to several design constraints. At the boundaries of the data cell windows for the receiver, the region where the state of the data cannot be precisely determined (also called 'metastability region') must be minimized to reduce the possibility of data errors. The decision circuit must also recover quickly after the transmission of each data bit to allow for maximum data transfer capability (also known as high data frequency). Finally, the recovered data pulse which leaves the decision circuit and which is sent to controller 13 should be equal in time to the period of the recovered clock. This maximizes the available set-up and hold times for subsequent decoding and deserialization circuitry.

Figure 2:
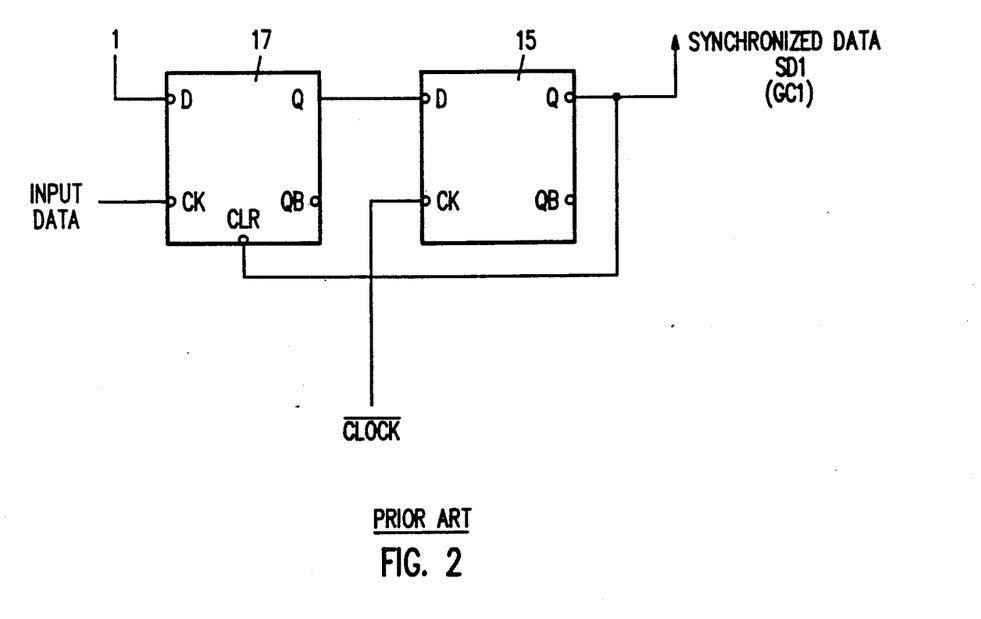
FIG. 2 is a block diagram of a first known data latch circuit.
Figures 4, 5:
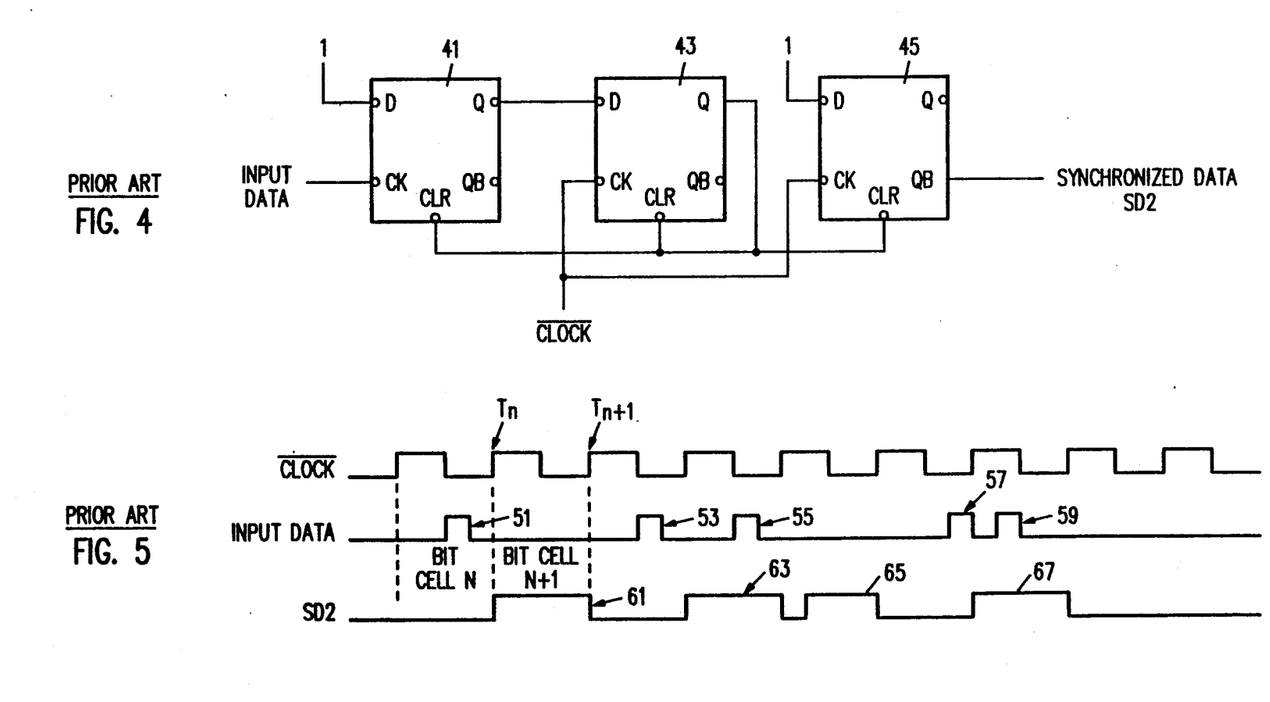
FIG. 4 is a block diagram of a second known data latch circuit.
FIG. 5 is a sample waveform input and output to and from the circuit of FIG. 4.

FIGS. 2 and 4 illustrate known decision circuits. The decision circuit of FIG. 2 is comprised of a first flip-flop 17 and a second flip-flop 15. Although the decision circuit of FIG. 2 produces an output pulse of the appropriate width (duration), it cannot tolerate the reception of repetitive data pulses which occur at or above the clock frequency. In the circuit shown in FIG. 2, the pulses must be spaced by one empty data bit cell to allow flip-flop 15's Q output to fall and release flip-flop 17. Although this is acceptable for many types of channel encoding schemes, it is inappropriate for those applications which transmit data at the clock frequency. Also, even when used in applications where data bits are spaced by at least one empty bit cell, the circuit may yield errors if the data is "jittery" due to random noise which pushes the data bits closer together than the circuit can tolerate.

Figure 3:
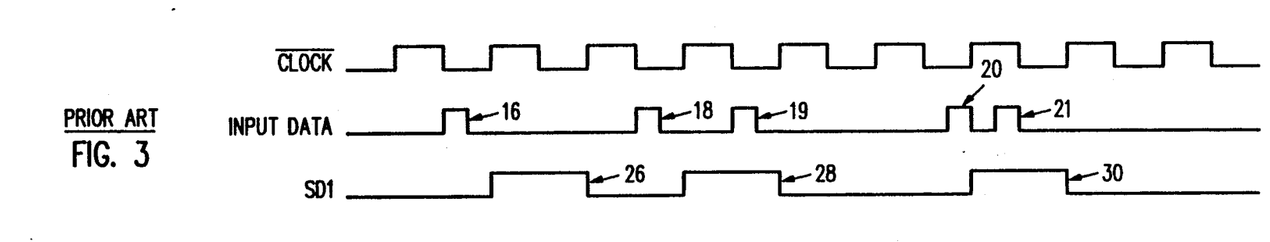
FIG. 3 is a sample waveform input and output to and from the circuit of FIG. 2.

As shown in FIG. 3, only data bits which are widely separated in time, such as bits 16 and 18, can be properly detected by the circuit shown in FIG. 2. Any bunching of data results in loss of data. Although data bits 16, 18, and 20 are properly detected and result in SD1 bits 26, 28 and 30, data bits 19 and 21 are undetected.

The circuit shown in FIG. 4 employs three flip-flops, numbered 41, 43, and 45 and a backlash clear method. As in the circuit of FIG. 2, flip-flop 41 is used as a bit trap—its output Q is set to a logical 1 whenever a data bit arrives (e.g., bit 51). The next arriving clock edge at $T_n$ sets flip-flop 43's Q output to a logic 1, which in turn clears all three flip-flops ('backlash clear'). Clearing flip-flop 45 initiates the SD2 output pulse at flip-flop 45's Q output (e.g., bit 62). The clear pulse generated by flip-flop 43 is quite short, which allows flip-flop 41 to receive new data one full clock period sooner than flip-flop 17 could in FIG. 2. At time $T_{n+1}$, the incoming clock pulse's edge re-clocks flip-flop 45 into the low state, ending the synchronized data output pulse SD2. Flip-flop 41 cannot accept new data until approximately 2 gate delays (the propagation delay of flip-flop 43 and the clear-release time of flip-flop 41) following the rising clock edge at time $T_n$. Consequently, from the time a bit in data cell N first clocks flip-flop 41 until flip-flop 41 is cleared or released, a "blind spot" encroaches into the next bit cell. As transfer frequency is increased and data bit size decreases, this blind region can extend over significant portions of the next N+1 data cell. This truncation of cell N+1 reduces high frequency data transmission and increases the error rate in so-called jittery data. The blind spot can be even wider as the clear pulse is extended, as is often necessary to insure proper operation. Also, the resulting SD2 output pulse is less than the desired width of one clock period as its leading edge is delayed more than its trailing edge.

As shown in FIG. 5, input data pulses 51, 53, 55 and 57 are all correctly detected and transmitted as SD2 output pulses 61, 63, 65 and 67, respectively. However, input pulse 59 has no corresponding output pulse, as the interval between delay pulse 57 and 59 is less than the two gate delay requisite to clear flip-flop 41.

Figure 6:
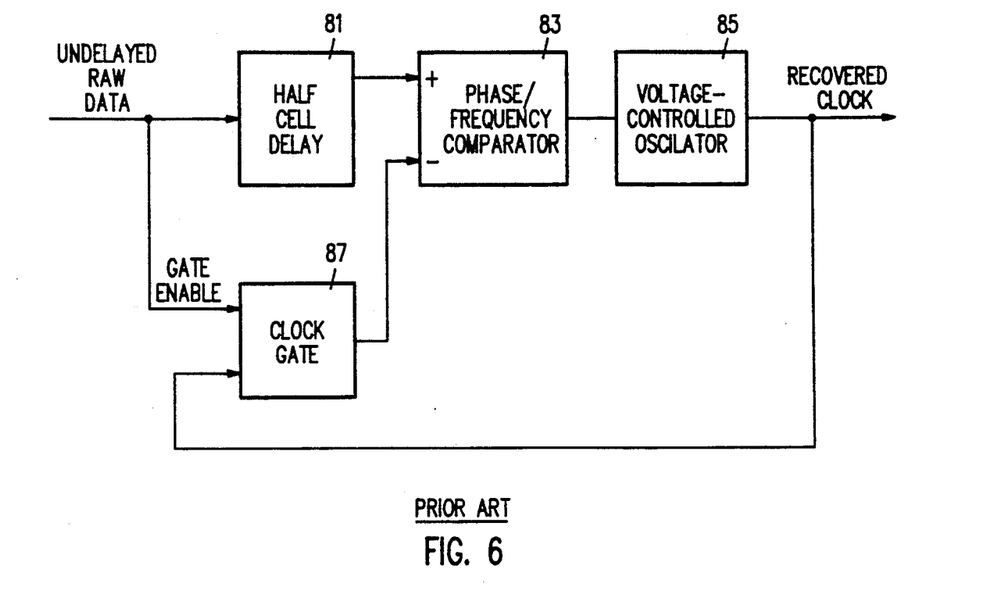
FIG. 6 is a detailed block diagram of the clock recovery circuit shown in FIG. 2.

As shown in FIG. 6, clock recovery circuit 11 shown in FIG. 1 is further comprised of a half cell delay 81, a positive-edge triggered phase/frequency comparator 83, clock gate 87 and VCO 85. In known clock recovery circuits, PLLs are often used for timing extraction. The output of the PLL comprises the recovered clock, which is in digital form. The output from the PLL is fed back to the negative input of a phase/frequency detector. Typically, the phase/frequency detector has a full frequency discrimination capability, which can force the local voltage/current controlled oscillator (VCO/ICO) toward the input data frequency regardless of the magnitude of the frequency difference. As the channel data is pseudo-random and often has no component t the actual clock frequency, unqualified feedback of the VCO would result i a widely wandering, unusable VCO frequency. To avoid this, the VCO feedback signal is first qualified by the arrival of an input data pulse on a one-to-one basis prior to being allowed into the negative input of the phase/frequency comparator. This qualifier circuit is referred to herein as clock gate 87. Like the first data synchronizing latch, the clock gate establishes a window about the average input data leading edge. If a data pulse arrives within any given window, i.e., between active clock edges, the next occurring clock edge is transmitted to the phase/frequency comparator circuit. An anticipator delay of one-half the VCO period is used to set and center this gating window.

Like the decision circuit, the clock gate should have a very small region of metastability at the window boundaries for minimum decision loss, a rapid recovery from transmission of each bit for maximum transfer rate capability (high data frequency) and an adequate gated clock output pulse width for subsequent circuitry.

Figure 7:
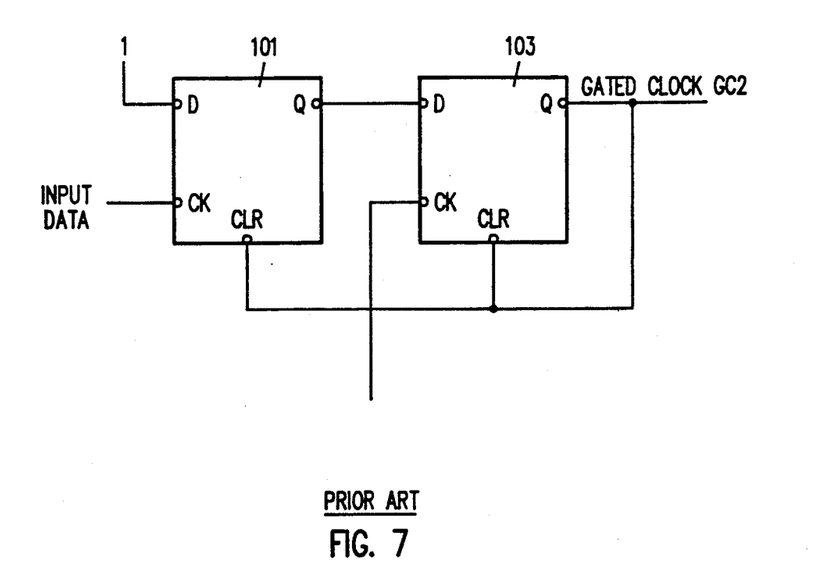
FIG. 7 is a block diagram of a known clock gate.

The circuit shown in FIG. 2 can be used as a clock gate. It has the same drawbacks when used as a clock gate as it did when used as a data latch, which limits its usefulness for high transfer rates and certain code types. A modification of this circuit, shown in FIG. 7, creates a backlash arrangement similar to that shown in FIG. 4. Unlike that circuit, it does not have a third flip-flop, which was used therein to reshape the output pulse to about the width of one clock cycle. Herein, the output GC2 pulse width is set by the self-clearing time of flip-flop 103. This pulse width may be inadequate for downstream circuitry and may have to be widened by the inclusion of additional delay gates in the clear path. Unfortunately, this also extends the "blind spot" width, discussed previously relative to FIGS. 2 and 4.

Figure 8:
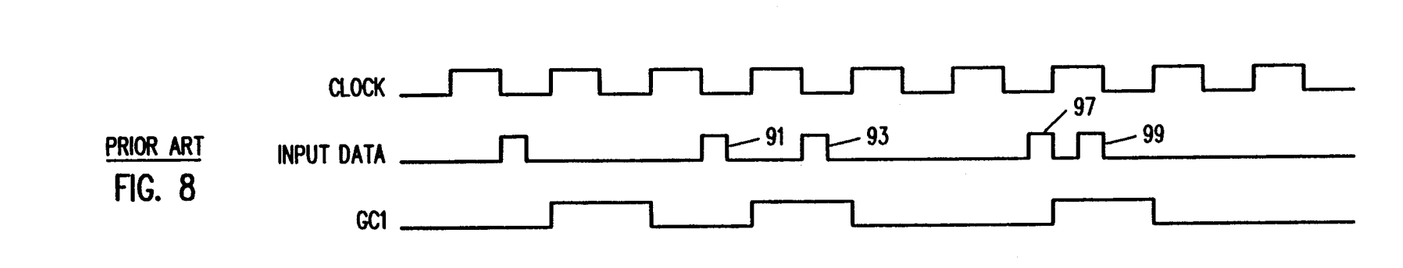
FIG. 8 is a sample waveform input and output to and from the circuit of FIG. 2, when that circuit is used as a clock gate.
Figure 9:
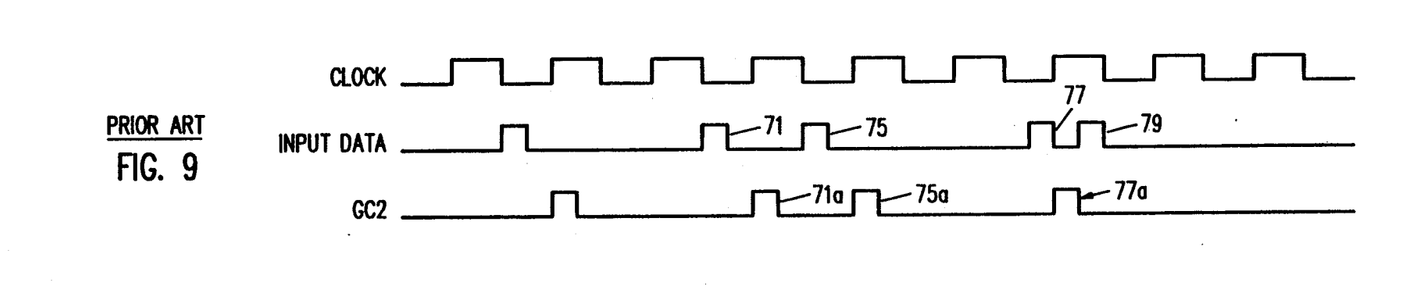
FIG. 9 is a sample waveform input and output to and from the circuit of FIG. 7.

FIG. 8 illustrates a sample input, clock and output waveform when the circuit of FIG. 2 is used as a clock gate. Note how data pulses one clock period or less apart (pulses 91 and 93, 97 and 99) result in the second clock pulse being lost. As shown in FIG. 9, the circuit shown in FIG. 7 performs slightly better, as it detects pulses 1 clock cycle (see pulses 71 and 75, whose output are pulses 71a and 75a) or more apart. However, more closely spaced pulses (pulses 77 and 79) still result in an output indicating that only the first pulse (pulse 77a) was detected.

Figure 10:
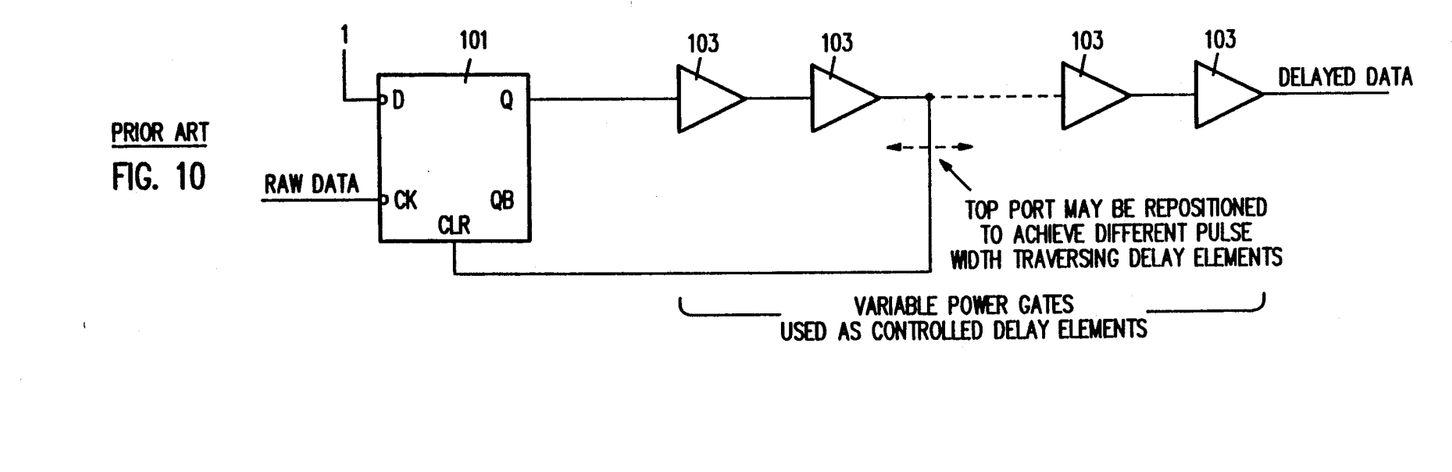
FIG. 10 is a known delay circuit.

Finally, as shown in FIG. 6, a delay line (half cell delay 81) is needed in the clock recovery circuit. In known variable-power, multiple gate-type delay lines, pulses passing through the delay line may become distorted or even disappear or collapse at low power operating levels or with long delays prior to reaching the delay line output. This occurs because the one-shot pulse conditioning circuitry generally used as the front end of the delay line produces pulses which are too narrow, under certain conditions, for proper delay line functioning. The one-shot circuitry also has the backlash clear limitation on high-frequency operation previously discussed and relative to the data latch and gated clock. A known delay circuit is shown in FIG. 10 and comprises flip-flop 101 and delay elements 103.

The need thus exists for a fast data synchronizing latch, a fast clock gate and a high frequency delay line which can improve the performance of known receiver systems.

SUMMARY OF THE INVENTION

In a first preferred embodiment of the present invention which comprises a receiver for clock recovery and data timing, a fast data synchronizing latch, fast clock gate, and high frequency delay line are disclosed.

The data synchronizing latch comprises a first flip-flop acting as a bit trap, and a second flip-flop which receives the Q output of the first flip-flop and a clock pulse, the Q output of the second flip-flop being used as the input to a third flip-flop and one input of a two-input XOR gate. The output of the third flip-flop is used as the second input of the XOR gate. By not using the clear inputs of the flip-flops, the present invention has no blind spot for incoming data. Additionally, all flip-flops herein change state only once for each data bit, as opposed to the flip-flops in known counterparts, which change state twice per data bit.

Two preferred embodiments of the fast clock gate are disclosed herein. In the first, a first flip-flop uses the incoming data as its clock input and its own $\overline{Q}$ output as its D input resulting in a toggle configuration The Q output is applied to the D-input of the second flip-flop, which also has a clock input. The Q output of this second flip-flop is applied to the D-input of a third flip-flop, which shares the same clock signal as the second flip-flop but in inverted form. The output of the third flip-flop is applied as an input to an XOR gate, the output of the second flip-flop also being applied to the XOR gate. The output of the XOR gate is the gated clock. Again, as the clear input of the flip-flops is never used, this clock gate has no blind spots.

The delay line comprises a first flip-flop, a plurality of delay elements/gates and an XOR gate. Raw data is applied as the clock input of the flip-flop, the D-input being the $\overline{Q}$ output of the flip-flop. The $\overline{Q}$ output is applied to the first of the plurality of inverter gates, and the Q output is applied to an XOR gate. The delayed output is also applied to the XOR gate. The output of the XOR gate is then the delayed data.

The construction and operation of these circuits will now be described in detail with reference to the following figures:

DESCRIPTION OF THE SPECIFIC EMBODIMENT

Figure 11:
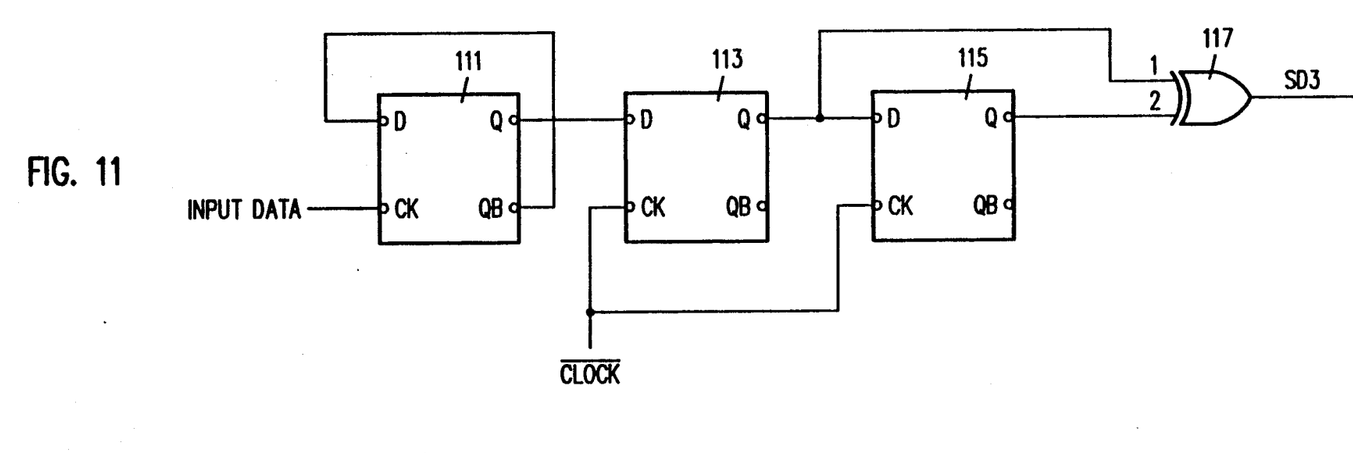
FIG. 11 is a block diagram of the fast data synchronizing latch of the present invention.

As shown in FIG. 11, the fast data synchronizing latch is comprised in this embodiment of three flip-flops, numbered respectively 111, 113 and 115, and an two-input XOR gate 117. Each flip-flop has a clock and data input and a Q and $\overline{Q}$ outputs.

Flip-flop 111 receives the input data on the clock input, the data input being coupled to the $\overline{Q}$ output. The Q output is coupled to the data input of flip-flop 113. The clock inputs of flip-flop 113 and 115 are both coupled to the system clock. The Q output of flip-flop 113 is coupled to both one input of XOR gate 117 and to the data input of flip-flop 115. The Q output of flip-flop 115 is then coupled to the other input gate of XOR 117. The output of XOR 117 is labelled SD3 (Synchronized Data 3).

Figure 12:
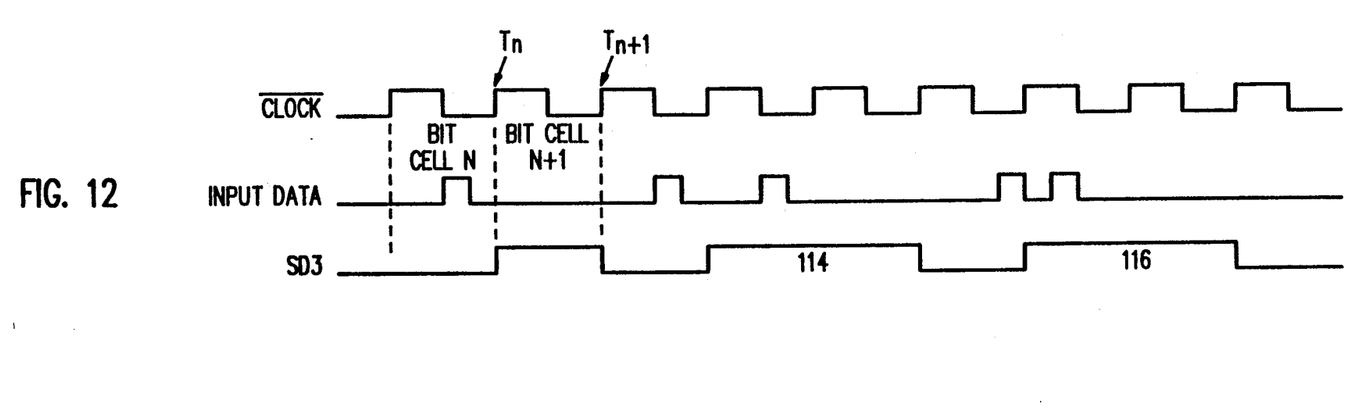
FIG. 12 is a sample clock, input and output waveform as produced by the circuit of FIG. 11.

In operation, referring simultaneously to figures 11 and 12, flip-flop 111 serves as a bit trap. It is not tripped and cleared with each input data pulse, but instead only toggles with the rising edge of incoming data. Indeed, in the present invention, no flip-flops are ever cleared, thereby eliminating the blind spot which invariably occurs while the clear pulse is triggered. Additionally, in comparison with the latches shown in FIGS. 2 and 4, all the flip-flops of the present invention operate at about one-half the frequency of the latches illustrated therein.

In the absence of any input data, all the flip-flops are in the same logical state. For simplicity, assume that all flip-flops have the same Q output (low). An incoming data pulse toggles flip-flop 111 into a logical 1 state. Clock pulse edge $T_n$, in combination with the high Q output from flip-flop 111, sets flip-flop 113's Q output to a logic 1. As flip-flop 113 and flip-flop 115 now have opposite states, the SD3 output from XOR 117 is a logic 1. The next incoming clock pulse, $T_{n+1}$, sets flip-flop 115's Q output to a logic 1. The output of XOR 117 then returns to logic 0, ending the SD3 output pulse. The resulting SD3 output pulse is exactly the desired width of one clock period, as both the rising and falling edges of the pulse see the same number of gate delays relative to the incoming clock signal.

Data bits arriving at the clock frequency produce a continuous logic 1 SD3 output (114 in FIG. 12), which is the desired response to an "all ones" return-to-zero ('RZ') incoming data pattern; that is, input data pulses arriving at the clock frequency Additionally, data bit doublets may be spaced significantly closer than the clock period. In fact, the present invention prevents encroachment of the Nth bit cell into the Nth+1 cell, as can occur in the known prior art. The ideal minimum spacing occurs when the Nth bit arrives just before the Nth clock edge and the Nth+1 bit arrives just after the Nth clock edge. In this case the present invention generates two contiguous SD3 output bits (see 114 and 116, FIG. 12) (SD3 is high for two full clock cycles). This minimum spacing is roughly equal to the setup time plus the hold time of flip-flop 113.

The data latch created by the present invention thus eliminates the 'blind spot' of the known prior art, allows even adjacent bit cells to be almost fully open, which in turn increases the tolerance for jittery data, and permits significantly higher transfer rates than the known art.

Clock Gate

Figure 13:
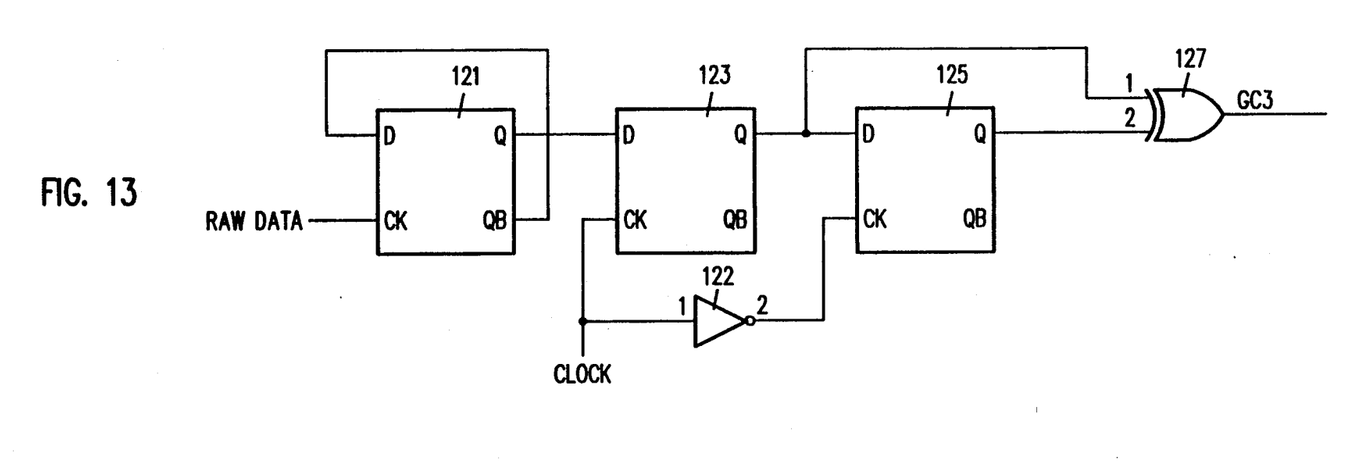
FIG. 13 is a block diagram of a first embodiment of the high frequency clock gate.

FIG. 13 shows a first embodiment of the present invention's high frequency clock gate. In this embodiment the clock gate is comprised of three flip-flops 121, 123, and 125, a two-input XOR gate 127 having a gated clock output labelled GC3 and an inverter 122. Each flip-flop has a clock input and data input, and Q and $\overline{Q}$ outputs. Flip-flop 121 receives the new data on its clock input, its data input being coupled to its $\overline{Q}$ output for toggle operation. Flip-flop 123's data input is coupled to flip-flop 121's Q output and its clock input is tied to the clock input signal. The Q output of flip-flop 123 is coupled to both one input of XOR 127 and the data input of flip-flop 125. The clock signal, after inversion by inverter 122 is applied to flip-flop 125's clock input, the Q output of flip-flop 125 being coupled to the other input of XOR 127.

In this embodiment, flip-flop 121 acts as a bit trap, and is not tripped and cleared with each input data pulse. Instead, it only toggles with the rising edge of incoming data. As in the data latch of the present invention described previously, no flip-flops are cleared in this embodiment, which eliminates the blind spot of the prior art. Additionally, each flip-flop changes state only once for each incoming data bit, as opposed to twice with the known art.

In operation, the absence of input data places all the flip-flops in the same logical state. For simplicity, assume each flip-flop is in a logic 0 state (all Q outputs low). An isolated incoming data pulse (124, FIG. 15a) toggles flip-flop 121 into a logic 1 state. The arrival of clock pulse edge $T_n$ sets flip-flop 123's Q output to Logic 1. As flip-flops 123 and 125 now have the opposite states, the output from XOR 127 is a logic 1, which begins the gated clock output pulse (126, FIG. 15a). The following falling clock edge changes the Q output of flip-flop 125 to a logic 1, which in turn causes the output of XOR gate 127 to go to logic zero, terminating the output pulse. The resulting output pulse is half the width of one clock period, allowing for transmission of gated clock pulses at the clock frequency with a positive pulse width equivalent to that of the clock waveform. Data bits may arrive at or even above the clock frequency, the theoretical minimum spacing occurring when a two-bit doublet with a first bit occurring just prior to the clock's falling edge and the second bit occurring just after the clock's rising edge is transmitted (see FIG. 15a, 128 and 130). Both bits will be accepted and will result in two adjacent gated clock output pulses (see FIG. 15a, 128a and 130a). The minimum spacing is roughly equivalent to the set-up time plus the hold time of flip-flop 125.

Figure 14:
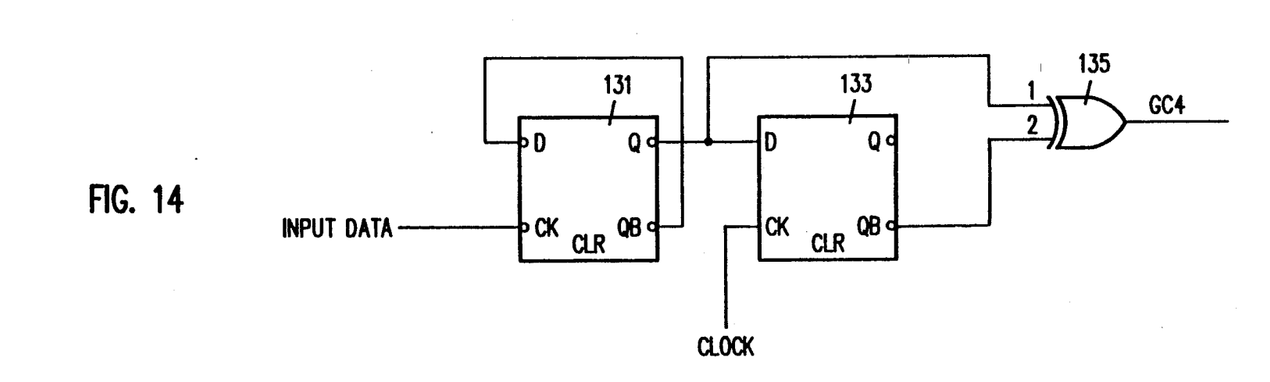
FIG. 14 is a block diagram of a second embodiment of the high frequency clock gate.

FIG. 14 is another embodiment of the gated clock. It comprises flip-flop 131, flip-flop 133 and XOR gate 135. Herein, flip-flop 131 receives input data on its clock input, its $\overline{Q}$ output is coupled to its data input and its Q output is coupled to the data input of flip-flop 133 and one input gate of XOR 135. The clock input of flip-flop 133 is coupled to a clock signal and its $\overline{Q}$ output is coupled to the other input of XOR 135.

In this embodiment, flip-flop 125 of FIG. 13 which served as a pulse extender is eliminated. In the absence of input data, the output of XOR 135 is high (see FIG. 15b). The circuitry coupled to the output of XOR 135 is rising-edge clocked, and is thus triggered by the next rising edge of the gated clock's output. When input data is received, flip-flop 131 changes to the opposite state from flip-flop 133, causing the output of XOR 135 to fall low (FIG. 15b, 136). The next arriving clock pulse's rising edge places flip-flop 133 in the same state as flip-flop 131, producing a rising edge to the output of XOR 135 (FIG. 15b, 138) which comprises the transmission of the gated clock information. In this embodiment, the output pulse width is a function of the position of the input data. The minimum gated clock output pulse width is equal to one gate delay plus the setup time of flip-flop 133. This can be extended by adding dummy gates at the $\overline{Q}$ output of flip-flop 133 as needed.

Figure 15A:
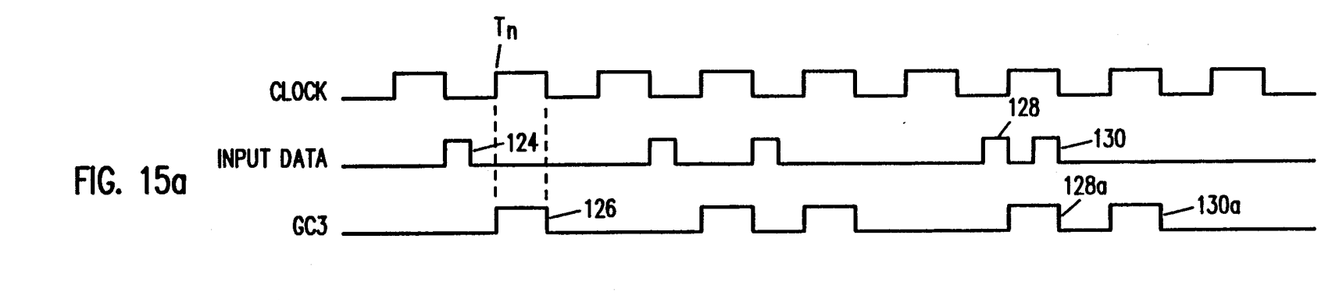
FIGS. 15a and 15b are sample clock, input, and output waveforms as produced by the circuits of FIGS. 13 and 14, respectively.
Figure 15B:
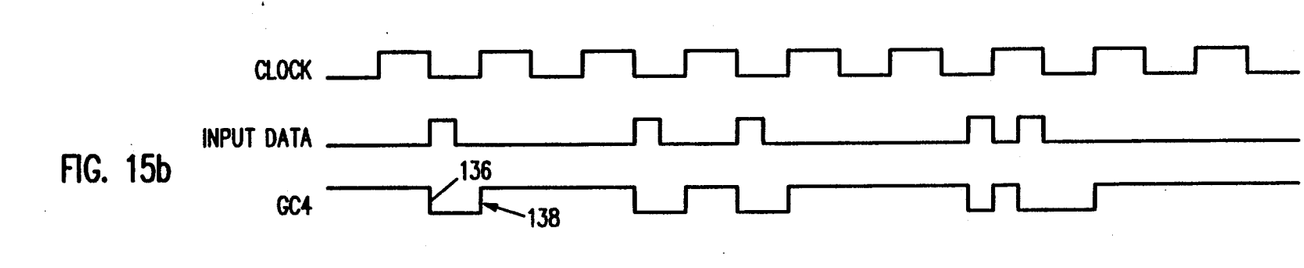

FIGS. 15a and 15b represent sample clock and data inputs, and the resultant gated clock outputs using the circuits of FIGS. 13 and 14.

Delay Line

Figure 16:
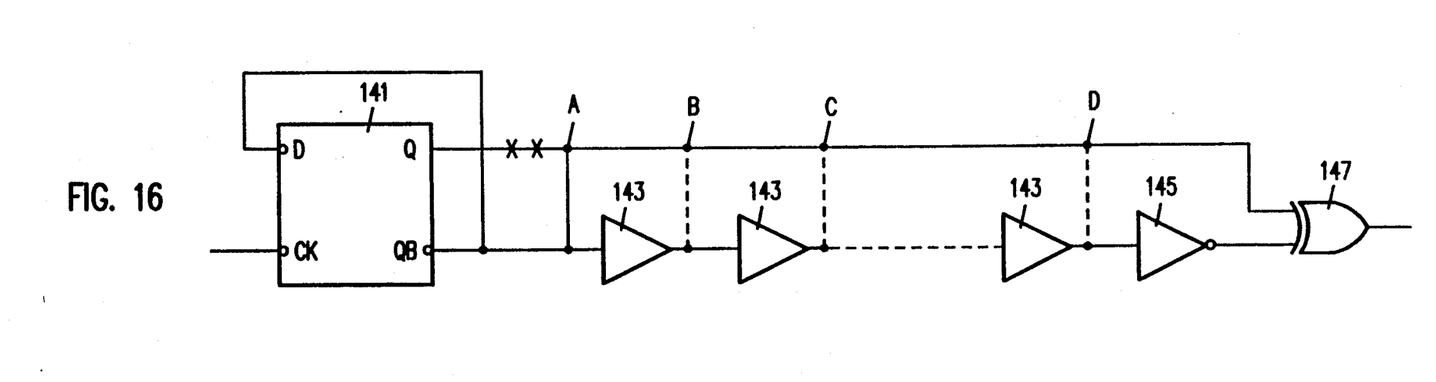
FIG. 16 is a block diagram of a high frequency delay line as taught by the present invention.

As shown in FIG. 16, the delay line of the present invention comprises flip-flop 141, a plurality of variable power gates 143 used as delay elements, an inverter 145 and an XOR gate 147. As shown, incoming data pulses toggle flip-flop 141. As the Q output feeds directly to the XOR with no delay, the XOR output immediately falls low. The state change event traverses the delay elements and causes the XOR output to go to a logical one again, the rising edge of the XOR output representing the delayed event as it does in prior art. Note that instead of a one-shot generated pulse traversing the delay element chain, the invention uses only a single change of state for each delay event. Since there is no pulse, just a state change, one does not have the risk of pulse compression/collapse as with the known art.

Both edges of flip-flop 141's output contain information, each edge representing the occurrence of an incoming data bit, which information is recovered at the output of the delay line by means of XOR gate 147.

Note that the XOR input line A in FIG. 16 may be moved to almost any connection point between delay elements further down the delay line such as points B, C or D. The effect of this movement would be a narrowing of the resulting XOR output pulse and a corresponding increase in the maximum frequency of pulse repetition through the delay line, to the point that the delay line could conceivably have more than one delay event (state transition) traversing the delay elements at any given time and still operate correctly.

Figure 17:
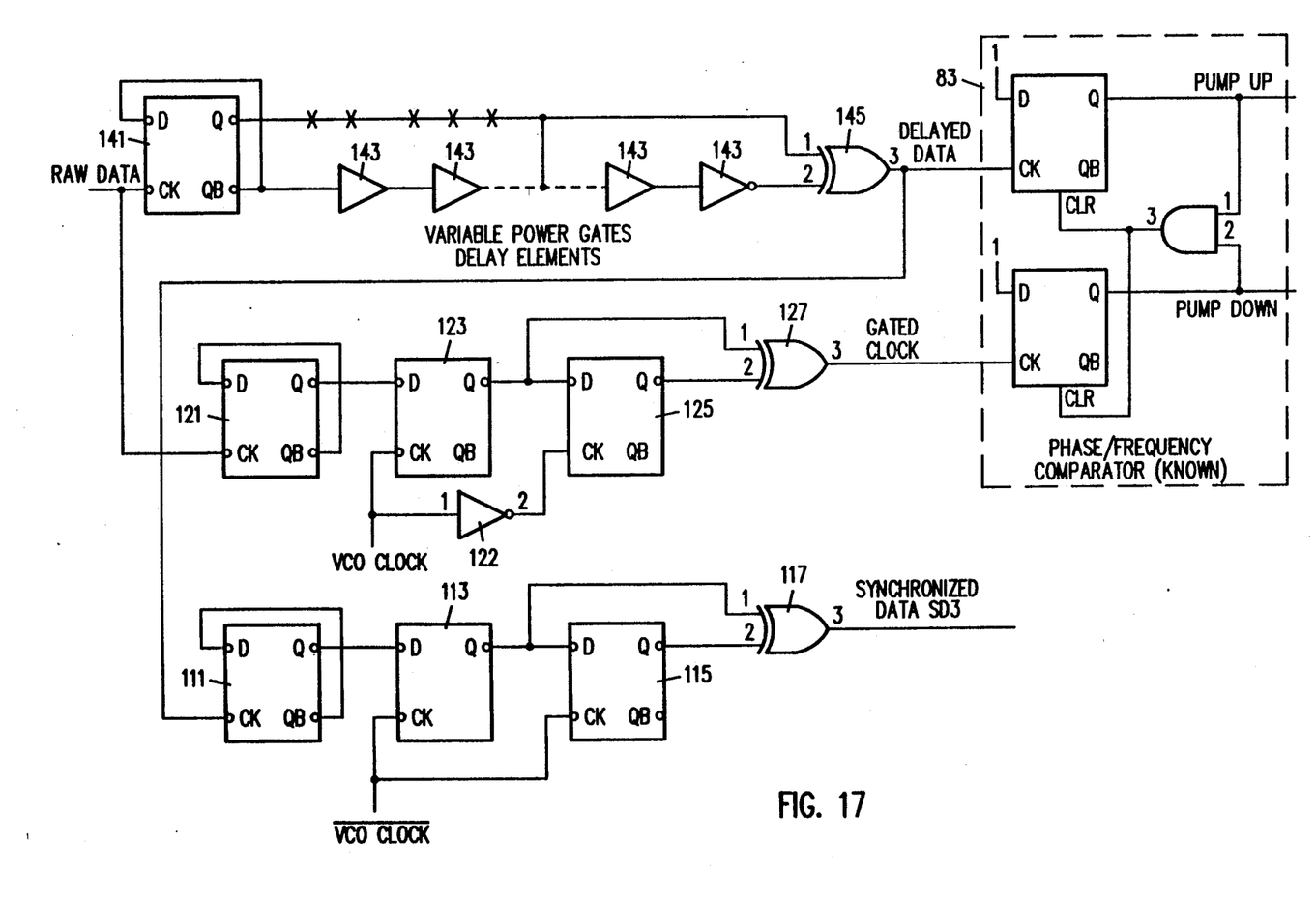
FIG. 17 shows a combined data latch, gated clock, and delay line circuit.

FIG. 17 shows how the data latch of FIG. 11, the gated clock circuit of FIG. 13, and the delay line of FIG. 16 can be combined to provide synchronized data SD3 and a gated clock GC3 and delayed data to Phase/Frequency Comparator 83 (FIG. 6).

Figure 18:
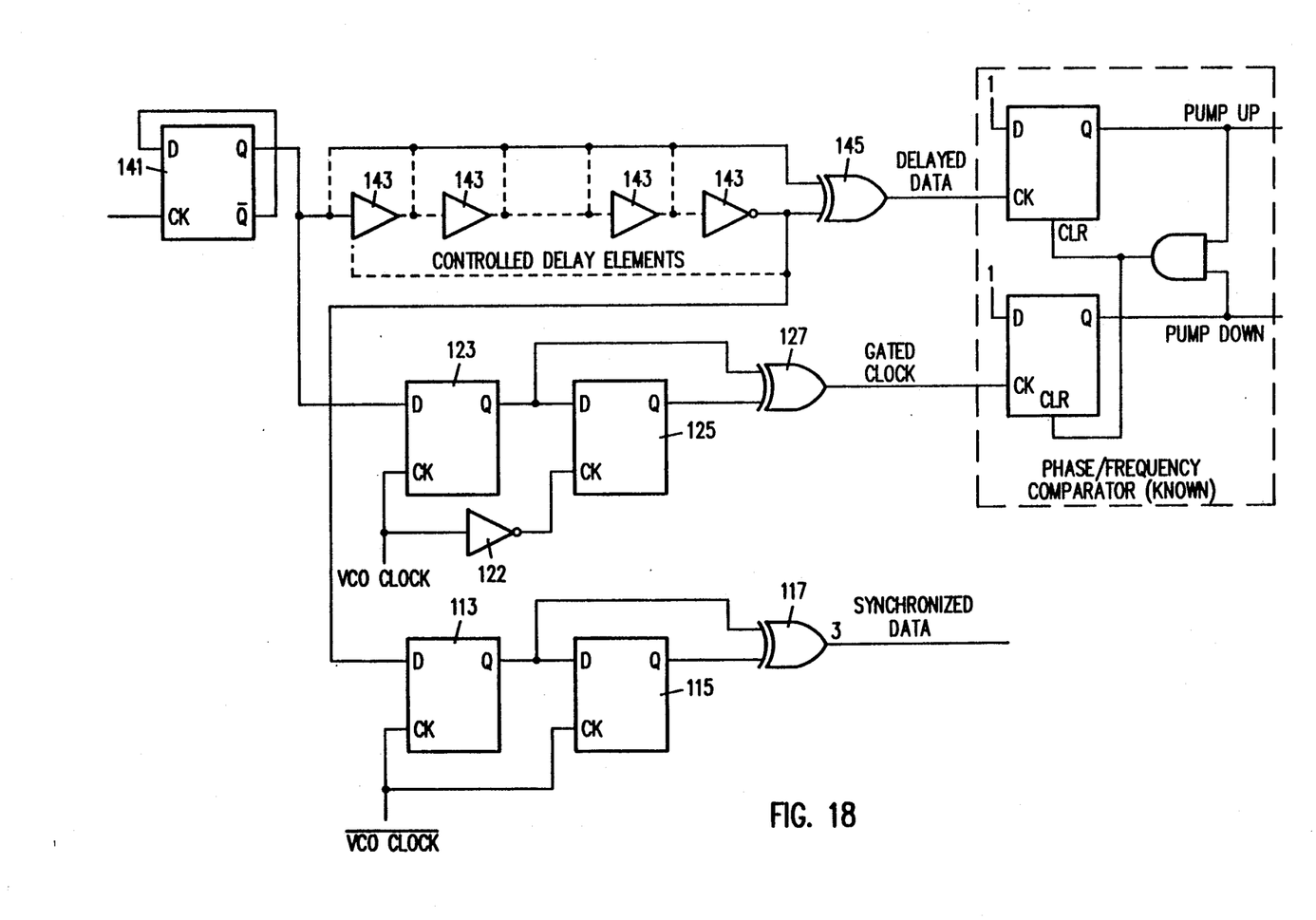
FIG. 18 shows another embodiment of the combined data latch, gated clock, and delay line circuit.

FIG. 18 is another embodiment of the circuit illustrated in FIG. 17. The three toggle-configured flip-flops of FIG. 17 (141, 121, and 111) have been reduced to a single toggle-configured flip-flop (141 only). Elimination of flip-flop 121 is straightforward, as it is an exact duplicate of flip-flop 141. Flip-flop 111 is eliminated by using the delayed, toggled data from the output of the delay line prior to the data being applied to the XOR gate.

The circuits shown in both FIGS. 17 and 18 must both meet stringent timing requirements for proper positioning of the data re-synchronization window and the phase detector window boundary (also known as phase detector re-trace angle). Although neither FIG. 17 nor FIG. 18 show any delay balancing elements, delay balancing as such is known and is usually achieved by placing dummy delay gates in the appropriate signal paths. The use of such known techniques and elements is fully within the scope of the present invention's disclosure and claims.

The present invention has now been described and discussed with respect to particular embodiments thereof. Variation and modifications may readily occur to those skilled in the art. In particular, it is the bi-modal nature of these circuits which eliminate the need for self-resetting (backlash reset) and which results in their performance improvements over the known art. Thus, in the present application, logic true can mean either a one or a zero, depending on which rest state the particular embodiment begins in (all flip-flop outputs high or low). Consequently, it is intended that the claims be interpreted to cover all such possible modifications and variations.

What is claimed is:

1. A gated clock circuit for gating a clock signal, the circuit comprising:
   first flip-flop means having a clock and a data input and a first and a second output, the second output being an inverted first output, the data input being coupled to the second output and the clock input being coupled to a raw data signal line;
   second flip-flop means having a clock and a data input and a first output, the data input being coupled to the first output of the first flip-flop means and the clock input being coupled to the clock signal;
   third flip-flop means having a clock and a data input and a first output, the data input being coupled to the first output of the second flip-flop means and the clock input being coupled to the clock signal through an inverter means; and
   exclusive OR logic means having a plurality of inputs and an output, a first input being coupled to the first output of the second flip-flop means and a second input being coupled to the first output of the third flip-flop means.

2. A gated clock circuit for gating a clock signal, the circuit comprising:
   first flip-flop means having a clock and a data input and a first and a second output, the second output being an inverted first output, the data input being coupled to the second output and the clock input being coupled to a raw data signal line;
   second flip-flop means having a clock and a data input and a first and a second output, the data input being coupled to the first output of the first flip-flop means and the clock input being coupled to the clock signal; and
   exclusive OR logic means having a plurality of inputs and an output, a first input being coupled to the first output of the first flip-flop means and a second input being coupled to the second output of the second flip-flop means.

3. A digital delay line circuit for controlled delay of digital pulses whose timing information is contained in their leading edges, the circuit comprising:
   first flip-flop means having a clock and a data input and a first and second output, the second output being an inverted first output, the data input being coupled to the second output and the clock input being coupled to a raw data signal line carrying the digital pulses;
   a plurality of delay element means having a controlled delay, the elements being connected in a series, the first delay element means having an input coupled to the second output of the first flip-flop; and
   exclusive OR logic means having a plurality of inputs and an output, a first input being coupled to one of the second output of the first flip-flop means and any connection point between delay element means, and a second input being coupled to the output of the last delay element, the output of the exclusive OR logic means being the delayed pulse.

4. The delay line circuit of claim 3 wherein the leading edges of the digital pulses are positive-going.

5. The delay line circuit of claim 3 wherein the leading edges of the digital pulses are negative-going.

6. A method for gating a clock signal, the method comprising the steps of:
  generating a logical true signal from a first logic means if the first logic means receives a logical true data signal;
  generating a logical true signal from a second logic means if the first logic means generates a logical true signal and the clock signal transitions to a logical true;
  generating a logical true signal from a third logic means if the output of the second logic means is a logical true and the clock signal, when inverted, transitions to a logical true; and
  generating a logical true signal representing the gates clock signal from a fourth logic means if the output of only one of the second and third logic means is a logical true.

7. A method for gating a clock signal, the method comprising the steps of:
  generating a logical true signal from a first logic means if the first logic means receives a logical true data signal;
  generating a logical true signal from a second logic means if the first logic means generates a logical true signal and the clock signal transitions to a logical true signal; and
  generating a logical true signal from a third logic means if only one of the first and second logic means is generating a logical true signal, the logical true signal from the third logic means representing the gated clock signal.

8. A method of delaying a digital pulse, the method comprising the steps of:
  generating a first pulse signal and an inverted first pulse signal from a first logic means;
  applying the inverted pulse signal to a series of delay elements having a predetermined total delay, said series of delay elements producing a second pulse signal;
  generating a signal representing the delayed digital pulse from a second logic means, the second logic means generating a logic true signal when only one of the first pulse signal and second pulse signal is a logic true signal.

9. A single channel serial data receiver, the receiver receiving intermixed data and clock pulses and transmitting delayed data pulses, a gated clock signal, and synchronized data, the receiver comprising:
  delay means for receiving the intermixed data pulses and transmitting delayed data pulses;
  clock gate means for receiving the intermixed data and clock pulses and transmitting gated clock pulses; and
  data latch means for receiving the intermixed data and clock pulses and transmitting synchronized data pulses; wherein the clock gate means comprises:
  first flip-flop means having a clock and a data input and a first and second output, the second output being the inverted first output, the data input being coupled to the second output and the clock input being coupled to a raw data signal line;
  second flip-flop means having a clock and a data input and a first and a second output, the data input being coupled to the first output of the first flip-flop means and the clock input being coupled to the clock signal;
  third flip-flop means having a clock and a data input and a first output, the data input being coupled to the first output of the second flip-flop means and the clock input being coupled to the clock signal through an inverter means; and
  exclusive OR logic means having a plurality of inputs and an output, a first input being coupled to the first output of the second flip-flop means and a second input being coupled to the first output of the third flip-flop means.

10. The receiver of claim 9 wherein the data latch means comprises:
  first flip-flop means having a clock and a data input and a first and a second output, the second output being an inverted first output, the clock input receiving the raw data and the data input being coupled to the second output;
  second flip-flop means having a clock and a data input and a first output, the data input being coupled to the first output of the first flip-flop means and the clock input being coupled to the clock signal;
  third flip-flop means having a clock and a data input and a first output, the data input being coupled to the first output of the second flip-flop means and the clock input being coupled to the clock signal; and
  exclusive OR logic means having a plurality of inputs and an output, at least a first input being coupled to the first output of the second flip-flop means and at least a second input being coupled to the output of the third flip-flop means, the output of the exclusive-OR means being the synchronized data.

11. A single channel serial data receiver, the receiver receiving intermixed data and clock pulses and transmitting delayed data pulses, a gated clock signal, and synchronized data, the receiver comprising:
  delay means for receiving the intermixed data pulses and transmitting delayed data pulses;
  clock gate means for receiving the intermixed data and clock pulses and transmitting gated clock pulses; and
  data latch means for receiving the intermixed data and clock pulses and transmitting synchronized data pulses; wherein the clock gate means comprises:
  first flip-flop means having a clock and a data input and a first and a second output, the second output being an inverted first output, the data input being coupled to the second output and the clock input being coupled to a raw data signal line;
  second flip-flop means having a clock and a data input and a first and a second output, the data input being coupled to the first output of the first flip-flop means and the clock input being coupled to the clock signal; and
  exclusive OR logic means having a plurality of inputs and an output, a first input being coupled to the first output of the first flip-flop means and a second input being coupled to the second output of the second flip-flop means.

12. The receiver of claim 11 wherein the data latch means comprises:
  first flip-flop means having a clock and a data input and a first and a second output, the second output being an inverted first output, the clock input receiving the raw data and the data input being coupled to the second output;

second flip-flop means having a clock and a data input and a first output, the data input being coupled to the first output of the first flip-flop means and the clock input being coupled to the clock signal;

third flip-flop means having a clock and a data input and a first output, the data input being coupled to the first output of the second flip-flop means and the clock input being coupled to the clock signal; and exclusive OR logic means having a plurality of inputs and an output, at least a first input being coupled to the first output of the second flip-flop means and at least a second input being coupled to the output of the third flip-flop means, the output of the exclusive-OR means being the synchronized data.

13. A single channel serial data receiver, the receiver receiving intermixed data and clock pulses and transmitting delayed data pulses, a gated clock signal, and synchronized data, the receiver comprising:

delay means for receiving the intermixed data pulses and transmitting delayed data pulses;

clock gate means for receiving the intermixed data and clock pulses and transmitting gated clock pulses; and data latch means for receiving the intermixed data and clock pulses and transmitting synchronized data pulses; wherein the delay means comprises:

first flip-flop means having a clock and a data input and a first and a second output, the second output being an inverted first output, the data input being coupled to the second output and the clock input being coupled to a raw data signal line carrying the digital pulses;

a plurality of delay element means having a controlled delay, the elements being coupled in series, the first delay element means having an input coupled to the second output of the first flip-flop and the last delay element having an inverter means; and exclusive OR logic means having a plurality of inputs and an output, a first input being coupled to one of the second output of the first flip-flop means and any connection point between delay elements, and a second input being coupled to the output of the last delay element, the output of the exclusive OR logic means being the delayed pulse.

14. The receiver of claim 13 wherein the data latch means comprises:

first flip-flop means having a clock and a data input and a first and a second output, the second output being an inverted first output, the clock input receiving the raw data and the data input being coupled to the second output;

second flip-flop means having a clock and a data input and a first output, the data input being coupled to the first output of the first flip-flop means and the clock input being coupled to the clock signal;

third flip-flop means having a clock and a data input and a first output, the data input being coupled to the first output of the second flip-flop means and the clock input being coupled to the clock signal; and exclusive OR logic means having a plurality of inputs and an output, at least a first input being coupled to the first output of the second flip-flop means and at least a second input being coupled to the output of the third flip-flop means, the output of the exclusive-OR means being the synchronized data.

* * * * *